United States Patent
Thomas et al.

(10) Patent No.: US 10,075,534 B1
(45) Date of Patent: Sep. 11, 2018

(54) METHOD, SYSTEM, AND APPARATUS FOR REDUCING CONTROL TRAFFIC IN CONNECTION WITH NEIGHBOR REACHABILITY CONFIRMATIONS

(71) Applicant: Juniper Networks, Inc., Sunnyvale, CA (US)

(72) Inventors: Reji Thomas, Bangalore (IN); Ronald Bonica, Sterling, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 94 days.

(21) Appl. No.: 15/219,269

(22) Filed: Jul. 25, 2016

(51) Int. Cl.
*H04L 12/24* (2006.01)
*H04L 29/08* (2006.01)
*H04L 12/26* (2006.01)

(52) U.S. Cl.
CPC ........ *H04L 67/145* (2013.01); *H04L 43/0811* (2013.01)

(58) Field of Classification Search
None
See application file for complete search history.

(56) References Cited

U.S. PATENT DOCUMENTS

| | | | | |
|---|---|---|---|---|
| 5,138,615 A * | 8/1992 | Lamport | .................. | H04L 45/02 370/400 |
| 8,041,335 B2 * | 10/2011 | Khetawat | .............. | H04W 12/08 455/404.1 |
| 9,792,106 B1 * | 10/2017 | Kommula | .................. | G06F 8/65 |
| 2011/0007669 A1 * | 1/2011 | Yoon | ..................... | H04L 45/026 370/255 |
| 2015/0138948 A1 * | 5/2015 | Cai | ..................... | H04L 43/0817 370/221 |

OTHER PUBLICATIONS

T. Narten et al., Neighbor Discovery for IP version 6 (IPv6), https://tools.ietf.org/html/rfc4861, Network Working Group, (Sep. 2007).
Keepalive, https://en.wikipedia.org/wiki/Keepalive, as accessed May 26, 2016, Wikipedia, (Mar. 19, 2005).

\* cited by examiner

*Primary Examiner* — Eunsook Choi
(74) *Attorney, Agent, or Firm* — FisherBroyles, LLP

(57) ABSTRACT

The disclosed method may include (1) receiving, at a network node within a network, a keepalive message of a routing protocol from a neighbor of the network node, (2) determining that the keepalive message of the routing protocol serves as evidence that the neighbor of the network node is currently reachable via a link within the network, (3) identifying a neighbor cache that includes entries for neighbors of the network node within the network, and then (4) refreshing an entry for the neighbor within the neighbor cache to avoid initiation of a reachability confirmation process directed to the neighbor due at least in part to the keepalive message of the routing protocol serving as evidence that the neighbor of the network node is currently reachable via the link. Various other methods, systems, and apparatuses are also disclosed.

20 Claims, 5 Drawing Sheets

| Neighbor Cache 120 | | | | |
|---|---|---|---|---|
| IPv6 Address | Age | Link-layer | Address State | Interface |
| 2092:0db8::93 | 0 | ccaa.bb11.5d0f | REACH | Et2/0 |
| fe80:a8bb::5d | 0 | ccaa.bb11.5d0f | DELAY | Et2/0 |
| ⋮ | ⋮ | ⋮ | ⋮ | ⋮ |

*FIG. 4*

METHOD, SYSTEM, AND APPARATUS FOR REDUCING CONTROL TRAFFIC IN CONNECTION WITH NEIGHBOR REACHABILITY CONFIRMATIONS

BACKGROUND

Control traffic is often used to advertise routes and/or node-identity information (such as Internet Protocol (IP) addresses, Media Access Control (MAC) addresses, and/or link-layer addresses) among network nodes within a network. For example, a network node may send a neighbor solicitation to various neighbors of the network node that are all connected to the same link. The neighbor solicitation may effectively query these neighbors for their respective IP and/or link-layer addresses.

In response to the neighbor solicitation, these neighbors may each send a neighbor advertisement back to the network node. These neighbor advertisements may identify and/or include the IP and/or link-layer addresses of the solicited neighbors. Upon receiving these neighbor advertisements, the network node may record the IP and/or link-layer addresses of the solicited neighbors in a neighbor cache that includes entries for neighbors of the network node. This network node may then refer to and/or rely on these entries in the neighbor cache to forward traffic to the corresponding neighbors.

These entries may each have a status that indicates whether the corresponding neighbor is currently known to be reachable via that link. In a traditional configuration, to maintain a neighbor cache entry in a reachable state, the network node may either glean hints of the corresponding neighbor's reachability from Transmission Control Protocol (TCP) traffic or perform a reachability confirmation using the Neighbor Discovery (ND) protocol. Since ND reachability confirmations often generate a lot of control traffic within the network, the process of gleaning hints from TCP traffic may be preferable and/or advantageous.

Unfortunately, some network nodes may experience lulls in TCP traffic. As a result, in the traditional configuration, these network nodes may need to perform reachability confirmations using the ND protocol to determine whether certain neighbors are still reachable, thereby generating significant amounts of control traffic within the network and/or consuming network resources and/or bandwidth. The instant disclosure, therefore, identifies and addresses a need for methods, systems, and apparatuses for reducing control traffic in connection with neighbor reachability confirmations.

SUMMARY

As will be described in greater detail below, the instant disclosure generally relates to methods, systems, and apparatuses for his reducing control traffic in connection with neighbor reachability confirmations. In one example, a computer-implemented method for accomplishing such a task may include (1) receiving, at a network node within a network, a keepalive message of a routing protocol from a neighbor of the network node, (2) determining that the keepalive message of the routing protocol serves as evidence that the neighbor of the network node is currently reachable via a link within the network, (3) identifying a neighbor cache that includes entries for neighbors of the network node within the network, and then (4) refreshing an entry for the neighbor within the neighbor cache to avoid initiation of a reachability confirmation process directed to the neighbor due at least in part to the keepalive message of the routing protocol serving as evidence that the neighbor of the network node is currently reachable via the link.

Similarly, a system incorporating the above-described method may include (1) a keepalive module, stored in memory at a network node within a network, that (A) receives a keepalive message of a routing protocol from a neighbor of the network node and (B) determines that the keepalive message of the routing protocol serves as evidence that the neighbor of the network node is currently reachable via a link within the network, (2) a neighbor discovery module, stored in memory at the network node, that (A) identifies a neighbor cache that includes entries for neighbors of the network node within the network and (B) refreshes an entry for the neighbor within the neighbor cache to avoid initiation of a reachability confirmation process directed to the neighbor due at least in part to the keepalive message of the routing protocol serving as evidence that the neighbor of the network node is currently reachable via the link, and (3) at least one physical processor that executes the keepalive module and the neighbor discovery module.

A corresponding apparatus may include (1) a storage device that stores, at a network node within a network, a neighbor cache that includes entries for neighbors of the network node within the network and (2) at least one physical processor communicatively coupled to the storage device, wherein the physical processor (A) receives a keepalive message of a routing protocol from a neighbor of the network node, (B) determines that the keepalive message of the routing protocol serves as evidence that the neighbor of the network node is currently reachable via a link within the network, (C) identifies the neighbor cache that includes the entries for the neighbors of the network node within the network, and (D) refreshes an entry for the neighbor within the neighbor cache to avoid initiation of a reachability confirmation process directed to the neighbor due at least in part to the keepalive message of the routing protocol serving as evidence that the neighbor of the network node is currently reachable via the link.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary neighbor cache that includes entries for neighbors of the network node within the network.

Figure 1:
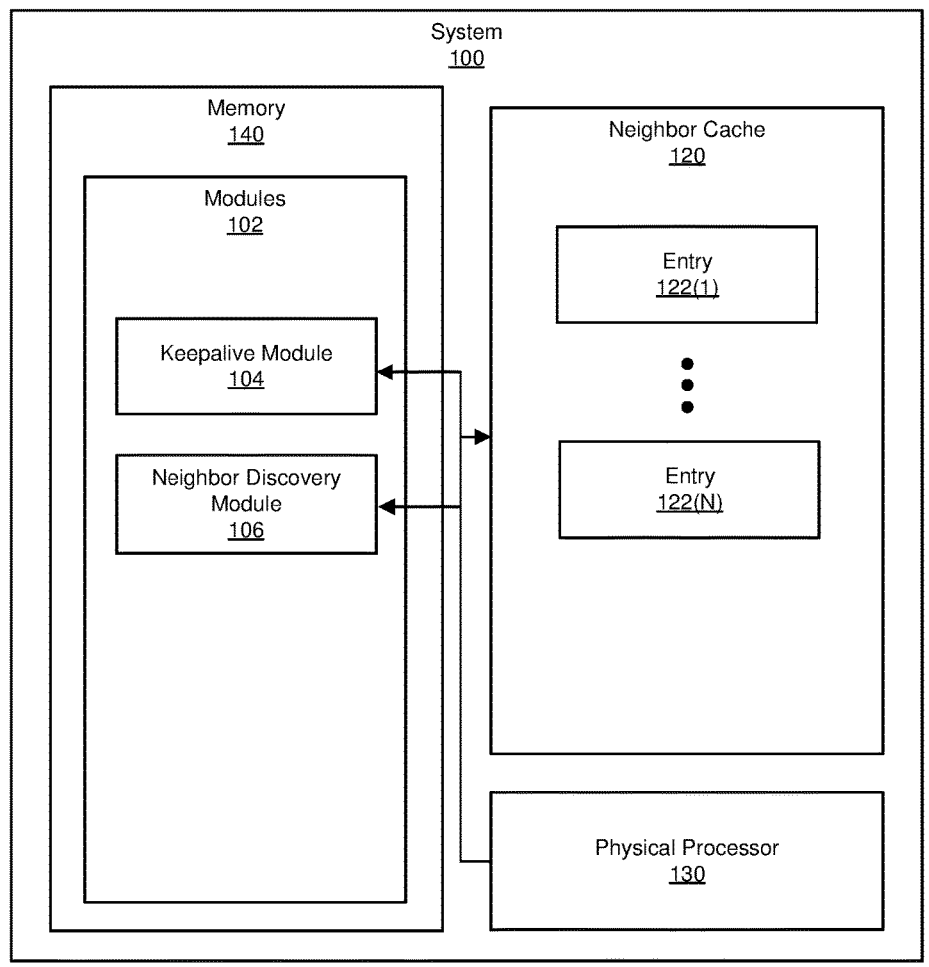
FIG. 1 is a block diagram of an exemplary apparatus for reducing control traffic in connection with neighbor reachability confirmations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various methods, systems, and apparatuses for reducing control traffic in connection with neighbor reachability confirmations. As will be explained in greater detail below, embodiments of the instant disclosure may enable network nodes to glean certain hints about a neighbor's reachability from control traffic (as opposed to TCP traffic). As a result, embodiments of the instant disclosure may avoid triggering ND reachability confirmations (which generate substantial control traffic and/or consume network resources and/or bandwidth) even in the absence of TCP traffic. Additionally or alternatively, embodiments of the instant disclosure may enable network nodes to confirm a neighbor's reachability more quickly using these control-traffic hints than using traditional ND messaging in the absence of TCP-traffic hints.

The term "control traffic," as used herein, generally refers to any type or form of communication transferred via the control plane (as opposed to the data plane). In some examples, control traffic may include and/or represent messages and/or packets exchanged using certain routing protocols. Examples of control traffic include, without limitation, Border Gateway Protocol (BGP) traffic, Protocol-Independent Multicast (PIM) traffic, Open Shortest Path First (OSPF) traffic, Routing Information Protocol (RIP) traffic, Bidirectional Forwarding Detection (BFD) traffic, variations or combinations of one or more of the same, and/or any other suitable traffic transferred by the control plane.

In contrast, the term "data traffic," as used herein, generally refers to any type or form of communication transferred via the data plane (as opposed to the control plane). In some examples, data traffic may include and/or represent messages and/or packets exchanged using certain transport protocols. For example, data traffic may include and/or represent messages and/or packets exchanged using TCP in one way or another.

While, in some contexts, the ND protocol may be considered a routing protocol, the ND protocol may not be considered a routing protocol in the instant application for purposes of clarity and readability. In other words, when the instant application mentions routing protocols, the instant application may be referring to routing protocols other than the ND protocol and with the exclusion of the ND protocol.

Figure 2:
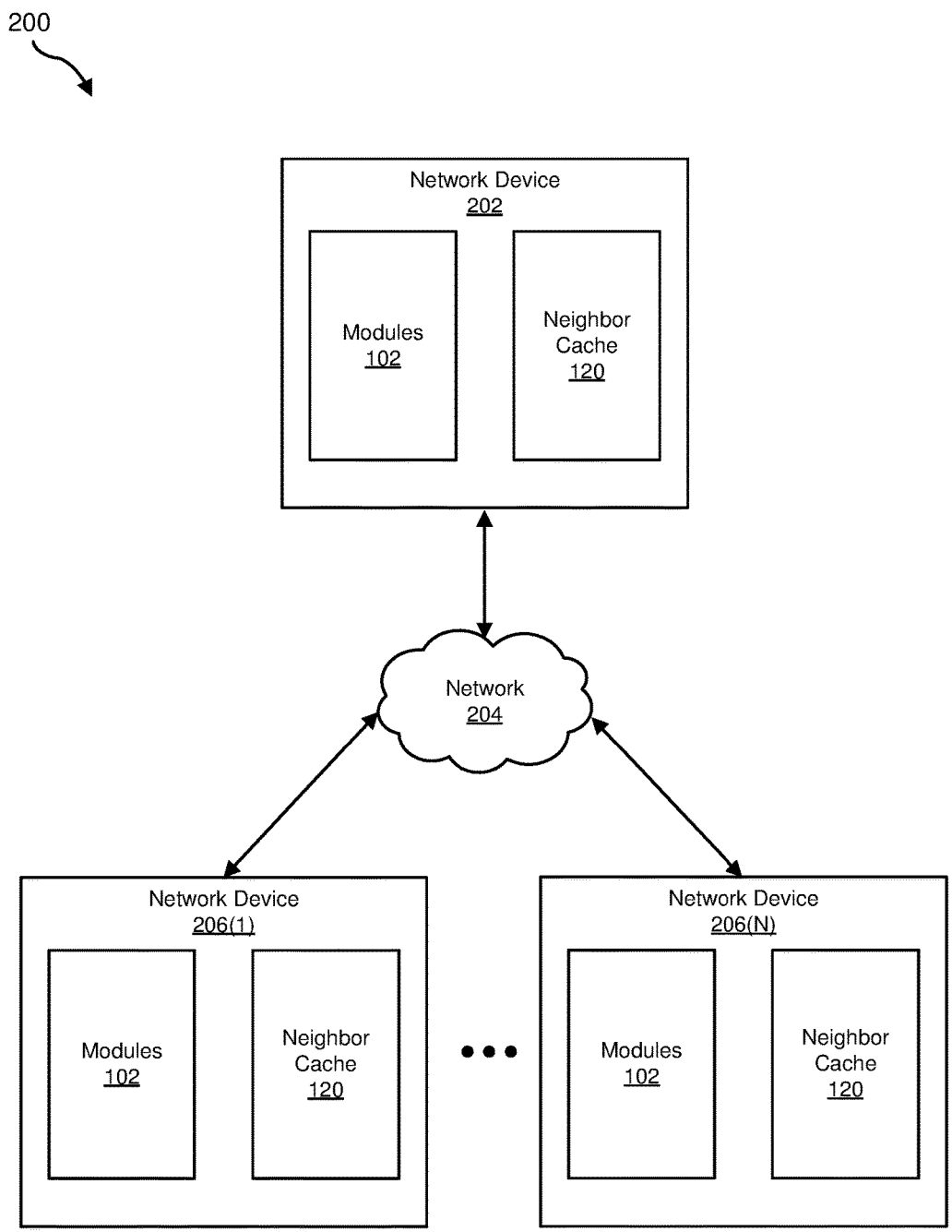
FIG. 2 is a block diagram of an exemplary apparatus for reducing control traffic in connection with neighbor reachability confirmations.

The following will provide, with reference to FIGS. 1 and 2, examples of systems and/or apparatuses that reduce control traffic in connection with neighbor reachability confirmations. The discussion corresponding to FIG. 3 will provide a detailed description of an exemplary method for reducing control traffic in connection with neighbor reachability confirmations. The discussion corresponding to FIG. 4 will provide a detailed description of an exemplary neighbor cache that includes entries for neighbors of a network node. Finally, the discussion corresponding to FIG. 5 will provide numerous examples of systems that may include the components shown in FIGS. 1 and 2.

FIG. 1 is a block diagram of an exemplary system 100 for reducing control traffic in connection with neighbor reachability confirmations. As illustrated in this figure, exemplary system 100 may include one or more modules 102 for performing one or more tasks. As will be explained in greater detail below, modules 102 may include a keepalive module 104 and/or neighbor discovery module 106. Although illustrated as separate elements, one or more of modules 102 in FIG. 1 may represent portions of a single module, application, and/or framework.

In certain embodiments, one or more of modules 102 in FIG. 1 may represent one or more software applications or programs that, when executed by a computing device, cause the computing device to perform one or more tasks. For example, as will be described in greater detail below, one or more of modules 102 may represent modules stored and/or configured to run on one or more computing devices, such as any of the devices illustrated in FIG. 2 (e.g., network device 202 and/or network devices 206(1)-(N)) and/or computing system 500 in FIG. 5. One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Additionally or alternatively, memory 140 may store, load, and/or maintain a neighbor cache that includes entries for neighbors of a network node within a network. Examples of memory 140 include, without limitation, Random Access Memory (RAM), Read Only Memory (ROM), flash memory, Hard Disc Drives (HDDs), Solid-State Drives (SSD), optical disk drives, caches, variations or combinations of one or more of the same, and/or any other suitable memory.

As illustrated in FIG. 1, exemplary system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to reduce control traffic in connection with neighbor reachability confirmations. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include and/or store one or more neighbor caches, such as neighbor cache 120. The term "neighbor cache," as used herein, generally refers to any type or form of computer database, repository, and/or cache that includes entries for neighbors of a network node within a network. In one example, neighbor cache 120 may include and/or identify entries 122(1)-(N) that each correspond to a different neighbor of a network node within a network. In this example, entries 122(1)-(N) may each include various information about the corresponding neighbor. Examples of such information include, without limitation, the neighbor's IP address, the age of the entry, the neighbor's link-layer address, the entry's current state, the interface and/or link to which the neighbor is connected, variations or combinations of one or more of the same, and/or any other suitable information about a network node's neighbor.

Exemplary system 100 in FIG. 1 may be implemented in a variety of ways and/or contexts. For example, all or a portion of exemplary system 100 in FIG. 1 may represent portions of exemplary system 200 in FIG. 2. As shown in FIG. 2, system 200 may include a network device 202 and one or more of network devices 206(1)-(N) in communication with one another via network 204. All or a portion of the functionality of modules 102 may be performed by network device 202, one or more of network devices 206(1)-(N), and/or any other suitable computing device (whether or not illustrated in FIG. 2).

As will be described in greater detail below, one or more of modules 102 from FIG. 1 may, when executed by at least one processor of network device 202 and/or one of network devices 206(1)-(N), enable that network device to reduce control traffic in connection with neighbor reachability confirmations. In one example, network device 202 and/or one or more of network devices 206(1)-(N) may be programmed with one or more of modules 102 that are stored in memory 140 and/or executable by physical processor 130. In this example, network device 202 and/or one or more of network devices 206(1)-(N) may create, build, modify, and/or update at least a portion of neighbor cache 120.

Although FIG. 2 illustrates network devices 202 and 206(1)-(N) as being external to network 204, one or more of these devices may alternatively represent a part of and/or be included in network 204. Moreover, FIG. 2 may illustrate only a portion of system 200 and/or the corresponding network. For example, system 200 may include various other networks and/or computing devices that are not necessarily illustrated in FIG. 2.

Network devices 202 and 206(1)-(N) each generally represent any type or form of computing device, system, and/or mechanism that facilitates the flow of network traffic within a network and/or across networks. In some examples, network devices 202 and 206(1)-(N) may each include and/or represent a router (such as a provider edge router, customer edge router, hub router, spoke router, autonomous system boundary router, and/or area border router). In one example, network devices 206(1)-(N) may include and/or represent neighbors of network device 202. Additional examples of network devices 202 and 206(1)-(N) include, without limitation, switches, hubs, modems, bridges, repeaters, gateways, multiplexers, network adapters, network interfaces, network racks, chasses, servers, computing devices, virtual machines running on one or more of the same, portions of one or more of the same, variations or combinations of one or more of the same, and/or any other suitable network devices. The terms "network device" and "network node" may be used interchangeably throughout the instant application.

Network 204 generally represents any type or form of medium and/or architecture that facilitates communication or data transfer. In some examples, network 204 may include and/or represent a single interface and/or link to which each of network devices 202 and 206(1)-(N) are connected and/or attached. Additional examples of network 204 include, without limitation, an MPLS network, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), a peer network, portions of one or more of the same, variations or combinations of one or more of the same, and/or any other suitable network. Network 204 may support and/or facilitate communication or data transfer using wireless and/or wired connections. Although FIG. 2 illustrates only a single network, alternative embodiments may include various other networks in addition to network 204. Additionally or alternatively, although FIG. 2 illustrates network 204 as a single entity, network 204 may alternatively include and/or represent a plurality of networks and/or subnetworks.

Figure 3:
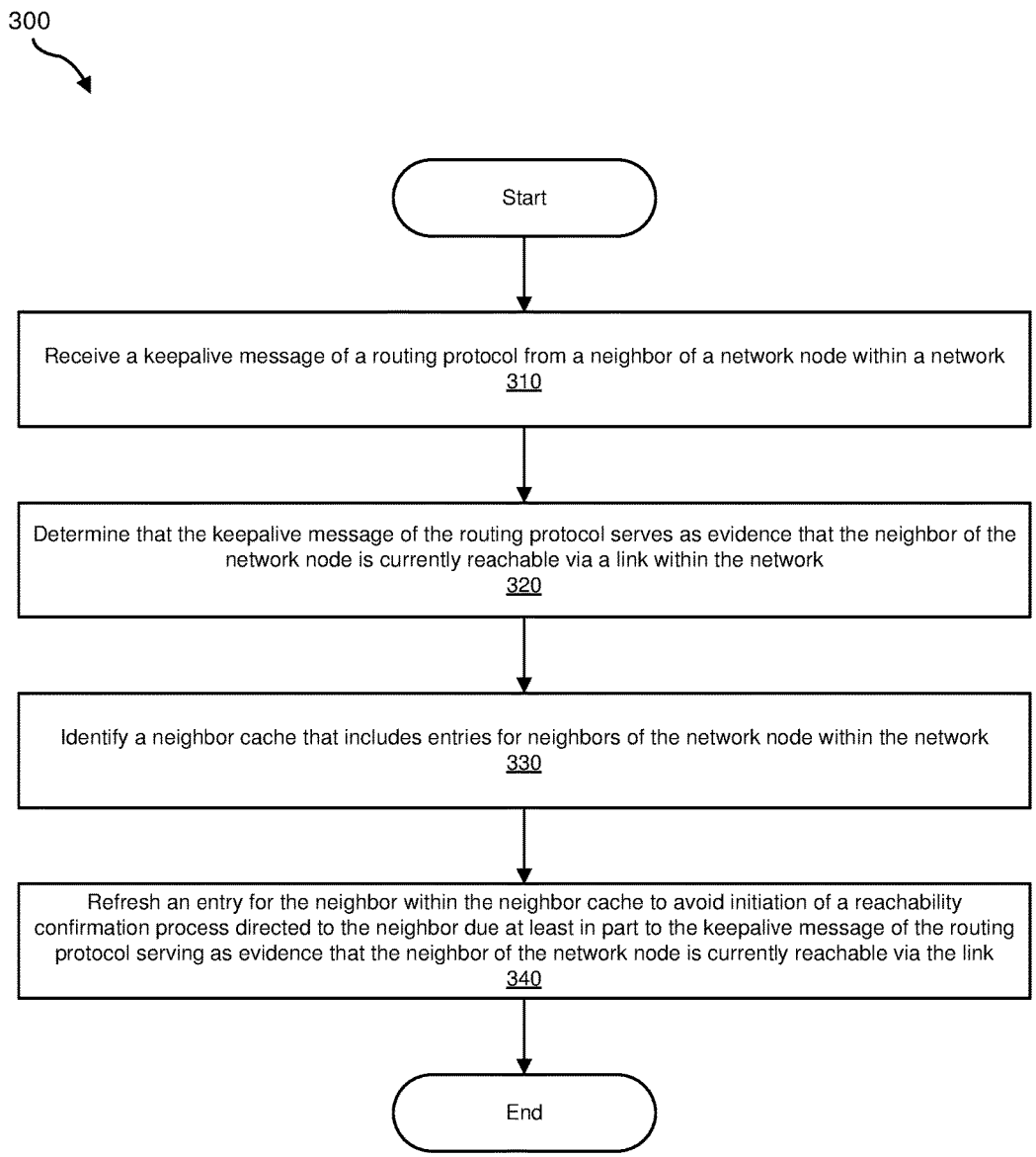
FIG. 3 is a flow diagram of an exemplary method for reducing control traffic in connection with neighbor reachability confirmations.

FIG. 3 is a flow diagram of an exemplary computer-implemented method 300 for reducing control traffic in connection with neighbor reachability confirmations. The steps shown in FIG. 3 may be performed by any suitable computer-executable code and/or computing system, including system 100 in FIG. 1, system 200 in FIG. 2, computing system 500 in FIG. 5, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may receive, at the network node within a network, a keepalive message of a routing protocol from a neighbor of the network node. For example, keepalive module 104 may, as part of network device 202, receive a keepalive message of a routing protocol from a neighbor of network device 202. In this example, the neighbor of network device 202 may include and/or be represented by one of network devices 206(1)-(N).

The term "neighbor," as used herein, generally refers to any type or form of network node that is connected and/or attached to the same interface and/or link as a reference network node. The term "keepalive message," as used herein, generally refers to any type or form of communication exchanged by network nodes to check, demonstrate, and/or prove the functionality of the interface and/or link that connects the network nodes to one another.

The systems described herein may perform step 310 in a variety of ways and/or contexts. In one example, keepalive module 104 may monitor network device 202 and/or corresponding communication channels or ports for any keepalive messages arriving in connection with certain routing protocols. While monitoring network device 202 and/or the corresponding communication channels or ports in this way, keepalive module 104 may detect and/or receive an incoming keepalive message pertaining to and/or formatted in a specific routing protocol. Examples of such routing protocols include, without limitation, BGP, PIM, OSPF, RIP, BFD, variations or combinations of one or more of the same, and/or any other suitable routing protocols.

As a specific example, network device 206(1) may send PIM keepalive messages to network device 202 on a periodic basis (e.g., every 30 seconds or so). In this example, keepalive module 104 may serve as a centralized manager that manages and/or records keepalive messages received by network device 202. As these PIM keepalive messages arrive at network device 202, keepalive module 104 may manage, handle, and/or record these PIM keepalive messages in connection with network device 202. Keepalive module 104 may also organize and/or keep track of these PIM keepalive messages based at least in part on the chronological order in which they arrived at network device 202.

In some examples, keepalive module 104 may include and/or represent a manager that monitors keepalive messages of various routing protocols at network device 202. For example, keepalive module 104 may monitor network device 202 for keepalive messages sent to network device 202 in one of the BGP, PIM, OSPF, RIP, and BFD protocols. Additionally or alternatively, keepalive module 104 may include and/or represent a component and/or portion of a process to which certain protocols (such as BGP, PIM, OSPF, RIP, and BFD protocols) offload their keepalive mechanisms.

Returning to FIG. 3, at step 320 one or more of the systems described herein may determine that the keepalive message of the routing protocol serves as evidence that the neighbor of the network device is currently reachable via a link within the network. For example, keepalive module 104 may, as part of network device 202, determine that the keepalive message of the routing protocol serves as evidence that the neighbor of network device 202 is currently reachable via a link within network 204. Keepalive module 104 may use this evidence as the basis for a hint about the neighbor's current reachability via the link. Keepalive module 104 may then pass this hint to neighbor discovery module 106 to enable neighbor discovery module 106 to confirm the neighbor's current reachability without resorting to an ND reachability confirmation process and/or generating any additional control traffic.

The systems described herein may perform step 320 in a variety of ways and/or contexts. In one example, keepalive module 104 may make this determination based at least in part on its own programming and/or control logic. For example, keepalive module 104 may detect the current and/or most recent keepalive message received from network device 206 within a valid timeframe. In this example, keepalive module 104 may be programmed to consider and/or designate that keepalive message as evidence that network device 206 is currently reachable via the link. Accordingly, keepalive module 104 may assume and/or deduce that network device 206 is currently reachable via the link based at least in part on that keepalive message.

In one example, keepalive module 104 may search the record of keepalive messages for the most recent keepalive message of any routing protocol received from the neighbor of network device 202. For example, the record of keepalive messages may include a variety of keepalive messages received from network device 206(1). Some of these keepalive messages may be old and/or expired. As a result, these old and/or expired keepalive messages may fail to indicate and/or suggest whether the link between network devices 202 and 206(1) is still functional and/or operational. However, in the event that the most recently received keepalive message is still valid and/or unexpired, keepalive module 104 may determine that network device 206(1) is currently reachable via the link based at least in part on that keepalive message.

Additionally or alternatively, keepalive module 104 may fire the most recently expired routing keepalive message from network device 206(1) in the event that the keepalive message is due in a delta interval. In this example, keepalive module 104 may use the resulting protocol keepalive confirmation to decide whether to trigger an ND reachability confirmation process directed to network device 206(1). For example, the status and/or state of the neighbor cache entry for network device 206(1) may move to delay. In response, neighbor discovery module 106 may query keepalive module 104 for the current reachability of network device 206(1). In the event that keepalive module 104 is unable to confirm the current reachability of network device 206(1) within the delay time interval, the status and/or state of the neighbor cache entry may move to probe, thereby triggering the ND reachability confirmation process and/or the transmission of ND packets.

Returning to FIG. 3, at step 330 one or more of the systems described herein may identify a neighbor cache that includes entries for neighbors of the network node within the network. For example, neighbor discovery module 106 may, as part of network device 202, identify neighbor cache 120 that includes entries 122(1)-(N) for neighbors of network device 202 within network 204. In this example, entry 122(1) may correspond and/or pertain to network device 206(1), and entry 122(N) may correspond and/or pertain to network device 206(N).

The systems described herein may perform step 330 in a variety of ways and/or contexts. In one example, neighbor discovery module 106 may identify neighbor cache 120 upon creation and/or installation of neighbor cache 120 on network device 202. Additionally or alternatively, neighbor discovery module 106 may identify neighbor cache 120 upon adding an entry to, modifying an entry in, refreshing an entry in, and/or deleting an entry from neighbor cache 120.

In some examples, neighbor discovery module 106 may include and/or represent a manager that manages and/or maintains entries 122(1)-(N) within neighbor cache 120 in connection with network device 202. For example, neighbor discovery module 106 may add an entry to, modify an entry in, refresh an entry in, and/or delete an entry from neighbor cache 120.

Returning to FIG. 4, at step 340 one or more of the systems described herein may refresh an entry for the neighbor within the neighbor cache to avoid initiation of a reachability confirmation process directed to the neighbor due at least in part to the keepalive message of the routing protocol serving as evidence that the neighbor of the network node is currently reachable via the link. For example, neighbor discovery module 106 may, as part of network device 202, refresh entry 122(1) within neighbor cache 120 to avoid initiation of a reachability confirmation process that uses the ND protocol and is directed to the neighbor of network device 202. In other words, since the keepalive message serves as evidence that the neighbor of network device 202 is currently reachable via the link, neighbor discovery module 106 may refresh entry 122(1) such that the reachability status of the neighbor identified in entry 122(1) is changed and/or renewed.

As a result, neighbor discovery module 106 may eliminate and/or avoid the need to trigger and/or resort to an ND reachability confirmation process that could potentially generate significant amounts control traffic (in the form of, e.g., neighbor solicitations and/or neighbor advertisements), especially when considered from the perspective and/or scale of the network as a whole. By eliminating and/or avoiding the ND reachability confirmation process in this scenario, neighbor discovery module 106 may effectively reduce control traffic, conserve network resources and/or bandwidth, and/or confirm the neighbor's reachability more quickly.

The phrase "to refresh," as used herein in connection with a neighbor cache entry, generally refers to any process that changes the status and/or state of the neighbor cache entry to reachable and/or maintains the neighbor cache entry at reachable by resetting the corresponding timer. The terms "reachability confirmation process" and "ND reachability confirmation," as used herein, generally refer to any process that involves exchanging neighbor solicitations and/or neighbor advertisements using the ND protocol.

By refreshing entry 122(1) in this way, neighbor discovery module 106 may help keep and/or maintain that neighbor's reachability consistent across the various routing and transport protocols. Otherwise, in the event that neighbor discovery module 106 misses that keepalive message and/or fails to refresh entry 122(1), the status and/or state of entry 122(1) may incorrectly change to unreachable even though certain protocols (such as BFD) have indications that the neighbor is alive. This change may cause at least some of the protocols to flap and/or become inconsistent with one another.

In some examples, keepalive messages and the reachability confirmation process may have a certain superfluous dependency on one another. This dependency may carry particular significance in situations when routing keepalive messages have finer granularity than the ND protocol. In such situations, the status and/or state of a neighbor's reachability from the perspective of one or more of the protocols may differ and/or vary from the status and/or state identified in the corresponding neighbor cache entry. For example, the status and/or state of a neighbor cache entry may move to unreachable due to the loss of ND packets even though the routing keepalive messages demonstrate a forward progress state, thereby leading to a protocol flap. These discrepancies may appear and/or occur more frequently when routing keepalive messages are offloaded to the forwarding engine.

The systems described herein may perform step 340 in a variety of ways and/or contexts. In one example, neighbor discovery module 106 may refresh entry 122(1) by resetting the timer corresponding to the status and/or state of entry 122(1). In this example, expiration of the timer may indicate that entry 122(1) is to change from reachable to a non-reachable state (such as stale and/or delay). By resetting the timer in this way, neighbor discovery module 106 may ensure that network device 202 does not initiate and/or trigger any reachability confirmation processes using the ND protocol unless the corresponding neighbor has failed to send specific keepalive messages to network device 202 within a certain period of time.

In one example, neighbor discovery module 106 may refresh entry 122(1) by changing the current state of entry 122(1) from a non-reachable state (such as stale and/or delay) to reachable. Neighbor discovery module 106 may also reset the timer corresponding to entry 122(1) upon changing the current state from the non-reachable state to reachable. By changing the current state of entry 122(1) and resetting the timer in this way, neighbor discovery module 106 may ensure that network device 202 does not initiate and/or trigger any reachability confirmation processes using the ND protocol unless the corresponding neighbor has failed to send specific keepalive messages to network device 202 within a certain period of time.

In one example, neighbor discovery module 106 may prevent entry 122(1) from changing from reachable to a non-reachable state (such as stale and/or delay). In this example, neighbor discovery module 106 may perform this prevention despite not having received positive confirmation about the neighbor's reachability via TCP and/or the ND protocol.

In one example, a non-reachable state of entry 122(1) may include and/or represent the delay state, which indicates that traffic is still been sent to the neighbor even though the neighbor is no longer known to be reachable. Additionally or alternatively, the delay state may indicate that neighbor discovery module 106 has not received positive confirmation about the neighbor's reachable within a certain amount of time even though a transport packet was recently sent to the neighbor via TCP. Another non-reachable state of entry 122(1) may include and/or represent the stale state, which indicates that traffic is no longer been sent to the neighbor and the neighbor is no longer known to be reachable.

In some examples, neighbor discovery module 106 may refresh entry 122(1) in response to receiving a notification from keepalive module 104. For example, keepalive module 104 may notify neighbor discovery module 106 that network device 206(1) is currently reachable via the link. In this example, keepalive module 104 may notify neighbor discovery module 106 by providing the most recently received keepalive message of one of the routing protocols to neighbor discovery module 106. Additionally or alternatively, keepalive module 104 may notify neighbor discovery module 106 by simply sending a hint and/or message indicating that network device 206(1) is likely to be currently reachable via the link.

In some examples, keepalive module 104 may notify neighbor discovery module 106 of the neighbor' reachability in response to a query from neighbor discovery module 106. As a specific example, neighbor discovery module 106 may detect a change in the status and/or state of entry 122(1) in neighbor cache 120 in FIG. 4. In this example, entry 122(1) may correspond to the "fe80:a8bb::5d" IPv6 address shown in neighbor cache 120 in FIG. 4. Similarly, entry 122(N) may correspond to the "2092:0db8::93" IPv6 address shown in neighbor cache 120 in FIG. 4.

As illustrated in FIG. 4, the address state of entry 122(1) in neighbor cache 120 may have changed from reachable to delay. In this example, neighbor discovery module 106 may detect this change in the status and/or state of entry 122(1) in neighbor cache 120. In response to this change, neighbor discovery module 106 may query keepalive module 104 for confirmation on the neighbor's current reachability. Keepalive module 104 may then respond to this query by notifying neighbor discovery module 106 of the neighbor's current reachability. On the one hand, in the event that a keepalive message of one of the routing protocols has recently arrived at network device 202 from the neighbor, keepalive module 104 may notify neighbor discovery module 106 that the neighbor is likely to be currently reachable via the link. In response to this notification, neighbor discovery module 106 may refresh entry 122(1) in neighbor cache 120.

On the other hand, in the event that no keepalive message of any of the routing protocols has recently arrived at network device 202 from the neighbor, keepalive module 104 may notify neighbor discovery module 106 that the neighbor is likely to be currently unreachable via the link. In response to this notification, neighbor discovery module 106 may refuse to refresh entry 122(1) in neighbor cache 120. In this example, neighbor discovery module 106 may even change the status and/or state of entry 122(1) in neighbor cache 120 from delay to probe. Neighbor discovery module 106 may then, as a last resort, initiate a reachability confirmation process directed to the neighbor using the ND protocol due at least in part to the status and/or state of entry 122(1) being changed to probe.

In some examples, keepalive module 104 may notify neighbor discovery module 106 about the neighbor's reachability via the link on a periodic basis. For example, keepalive module 104 may be programmed to notify neighbor discovery module 106 about the neighbor's reachability every 30 seconds or so. On the one hand, in the event that a keepalive message of one of the routing protocols has recently arrived at network device 202 from the neighbor, keepalive module 104 may notify neighbor discovery module 106 that the neighbor is likely to be currently reachable via the link. In response to this notification, neighbor discovery module 106 may refresh entry 122(1) in neighbor cache 120.

On the other hand, in the event that no keepalive message of any of the routing protocols has recently arrived at network device 202 from the neighbor, keepalive module 104 may notify neighbor discovery module 106 that the neighbor is likely to be currently unreachable via the link. In response to this notification, neighbor discovery module 106 may refuse to refresh entry 122(1) in neighbor cache 120. In this example, neighbor discovery module 106 may even change the status and/or state of entry 122(1) in neighbor cache 120 to probe. Neighbor discovery module 106 may then, as a last resort, initiate a reachability confirmation process directed to the neighbor using the ND protocol due at least in part to the status and/or state of entry 122(1) being changed to probe.

In some examples, keepalive module 104 may fail to receive an expected keepalive message of one of the routing protocols from the neighbor. Keepalive module 104 may determine that this failure to receive the expected keepalive message serves as evidence that the neighbor is no longer reachable via the link. In response to this determination, keepalive module 104 may notify neighbor discovery module 106 that the neighbor is no longer reachable.

Figure 5:
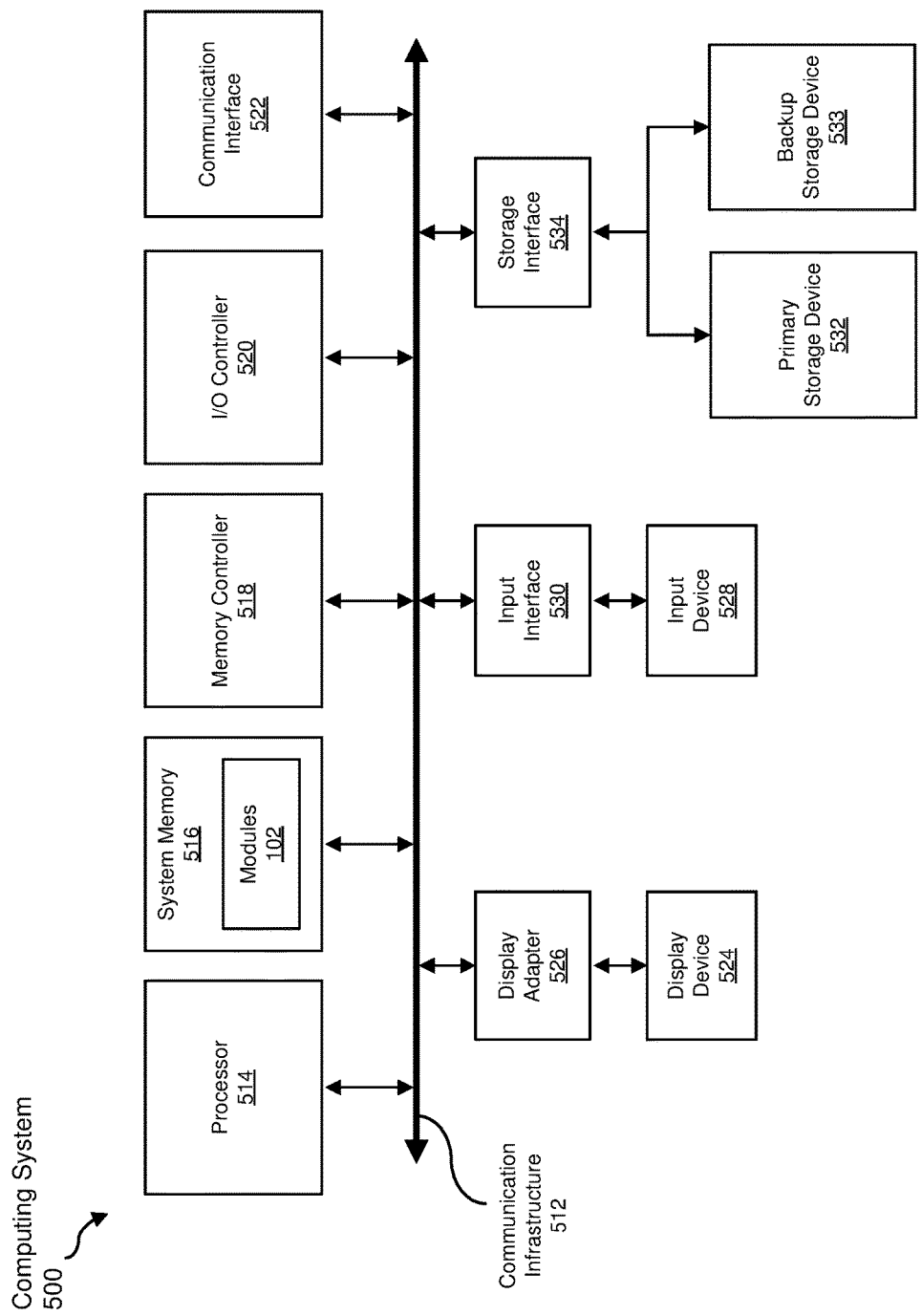
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 3. All or a portion of computing system 500 may also perform and/or be a means for performing and/or implementing any other steps, methods, or processes described and/or illustrated herein. In one example, computing system 500 may include and/or represent an apparatus that performs and/or constitutes a means for performing and/or implementing any other steps, methods, or processes described and/or illustrated herein.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving, via a control plane of a network node within a network, a keepalive message of a routing protocol of the control plane from a neighbor of the network node;
   determining that the keepalive message of the routing protocol serves as evidence that the neighbor of the network node is currently reachable via a link within the network;
   identifying a neighbor cache that includes entries for neighbors of the network node within the network; and
   refreshing an entry for the neighbor within the neighbor cache to:
      indicate that the neighbor is currently reachable via the link; and
      avoid initiation of a reachability confirmation process directed to the neighbor due at least in part to the keepalive message of the routing protocol serving as evidence that the neighbor is currently reachable via the link.

2. The method of claim 1, further comprising:
   providing a keepalive manager that monitors keepalive messages of a plurality of routing protocols at the network node; and
   providing a neighbor discovery manager that maintains the entries within the neighbor cache.

3. The method of claim 2, wherein receiving the keepalive message of the routing protocol comprises receiving, by the keepalive manager, the keepalive message of the routing protocol from the neighbor of the network node; and
   further comprising notifying, by the keepalive manager, the neighbor discovery manager that the neighbor of the network node is currently reachable via the link.

4. The method of claim 3, wherein notifying the neighbor discovery manager that the neighbor of the network node is currently reachable via the link comprises providing, by the keepalive manager, the keepalive message of the routing protocol to the neighbor discovery manager.

5. The method of claim 3, wherein notifying the neighbor discovery manager that the neighbor of the network node is currently reachable via the link comprises at least one of:
   notifying the neighbor discovery manager that the neighbor is currently reachable via the link in response to a query from the neighbor discovery manager; and
   notifying the neighbor discovery manager about the neighbor's reachability via the link on a periodic basis.

6. The method of claim 2, further comprising:
   determining, by the neighbor discovery manager, that the entry for the neighbor within the neighbor cache has changed from reachable to another state; and
   in response to determining that the entry for the neighbor has changed from reachable to the other state, direct the neighbor discovery manager to query the keepalive manager for confirmation about the neighbor's reachability.

7. The method of claim 6, wherein the other state comprises at least one of:
   a delay state indicating that traffic is still being sent to the neighbor even though the neighbor is no longer known to be reachable; and
   a stale state indicating that traffic is no longer being sent to the neighbor and the neighbor is no longer known to be reachable.

8. The method of claim 2, wherein determining that the keepalive message of the routing protocol serves as evidence that the neighbor of the network node is currently reachable comprises:
   directing the keepalive manager to search for the most recent keepalive message of any of the plurality of routing protocols received from the neighbor of the network node; and
   determining, based at least in part on the most recent keepalive message, that the neighbor of the network node is currently reachable.

9. The method of claim 2, wherein refreshing the entry for the neighbor within the neighbor cache comprises at least one of:
   resetting a timer whose expiration indicates that the entry for the neighbor is to change from reachable to another state; and
   preventing the entry for the neighbor from changing from reachable to another state even though the neighbor discovery manager has not necessarily received positive confirmation about the neighbor's reachability by way of the reachability confirmation process.

10. The method of claim 2, further comprising:
    failing to receive an expected keepalive message of the routing protocol from the neighbor of the network node;
    determining that the failure to receive the expected keepalive message of the routing protocol serves as evidence that the neighbor of the network node is no longer reachable via the link; and
    notifying the neighbor discovery manager that the neighbor of the network node is no longer reachable via the link due at least in part to the failure to receive the expected keepalive message serving as evidence that the neighbor of the network node is no longer reachable via the link.

11. The method of claim 1, wherein the routing protocol of the control plane comprises at least one of:
Border Gateway Protocol (BGP);
Protocol-Independent Multicast (PIM);
Open Shortest Path First (OSPF);
Routing Information Protocol (RIP); and
Bidirectional Forwarding Detection (BFD).

12. A system comprising:
a keepalive module, stored in memory at a network node within a network, that:
   receives, via a control plane of the network node, a keepalive message of a routing protocol of the control plane from a neighbor of the network node; and
   determines that the keepalive message of the routing protocol serves as evidence that the neighbor of the network node is currently reachable via a link within the network;
a neighbor discovery module, stored in memory at the network node, that:
   identifies a neighbor cache that includes entries for neighbors of the network node within the network; and
   refreshes an entry for the neighbor within the neighbor cache to:
      indicate that the neighbor is currently reachable via the link; and
      avoid initiation of a reachability confirmation process directed to the neighbor due at least in part to the keepalive message of the routing protocol serving as evidence that the neighbor is currently reachable via the link; and
at least one physical processor that executes the keepalive module and the neighbor discovery module.

13. The system of claim 12, wherein:
the keepalive module monitors keepalive messages of a plurality of routing protocols at the network node; and
the neighbor discovery module maintains the entries within the neighbor cache.

14. The system of claim 12, wherein the keepalive module notifies the neighbor discovery module that the neighbor of the network node is currently reachable via the link.

15. The system of claim 14, wherein the keepalive module notifies the neighbor discovery module that the neighbor of the network node is currently reachable via the link by providing the keepalive message of the routing protocol to the neighbor discovery module.

16. The system of claim 14, wherein the keepalive module notifies the neighbor discovery module that the neighbor is currently reachable via the link in response to a query from the neighbor discovery module.

17. The system of claim 14, wherein the keepalive module notifies the neighbor discovery module about the neighbor's reachability via the link on a periodic basis.

18. The system of claim 12, wherein the neighbor discovery module:
determines that the entry for the neighbor within the neighbor cache has changed from reachable to another state; and
queries, in response to determining that the entry for the neighbor has changed from reachable to the other state, the keepalive module for confirmation about the neighbor's reachability.

19. The system of claim 18, wherein the other state comprises at least one of:
a delay state indicating that traffic is still being sent to the neighbor even though the neighbor is no longer known to be reachable; and
a stale state indicating that traffic is no longer being sent to the neighbor and the neighbor is no longer known to be reachable.

20. An apparatus comprising:
a storage device that stores, at a network node within a network, a neighbor cache that includes entries for neighbors of the network node within the network; and
at least one physical processor communicatively coupled to the storage device, wherein the physical processor:
   receives, via a control plane of the network node, a keepalive message of a routing protocol of the control plane from a neighbor of the network node;
   determines that the keepalive message of the routing protocol serves as evidence that the neighbor of the network node is currently reachable via a link within the network;
   identifies the neighbor cache that includes the entries for the neighbors of the network node within the network; and
   refreshes an entry for the neighbor within the neighbor cache to:
      indicate that the neighbor is currently reachable via the link; and
      avoid initiation of a reachability confirmation process directed to the neighbor due at least in part to the keepalive message of the routing protocol serving as evidence that the neighbor is currently reachable via the link.

* * * * *